Feb. 12, 1952  A. H. PEARSON  2,585,828
ROTARY INDEXING FIXTURE
Filed Feb. 18, 1946  7 Sheets-Sheet 4

INVENTOR.
Alan H. Pearson
BY
Whittemore Hulbert & Belknap
ATTORNEYS

Feb. 12, 1952 A. H. PEARSON 2,585,828
ROTARY INDEXING FIXTURE
Filed Feb. 18, 1946 7 Sheets-Sheet 6

INVENTOR.
Alan H. Pearson
BY
Whittemore Hulbert & Belknap
ATTORNEYS

Feb. 12, 1952　　　A. H. PEARSON　　　2,585,828
ROTARY INDEXING FIXTURE
Filed Feb. 18, 1946　　　7 Sheets-Sheet 7
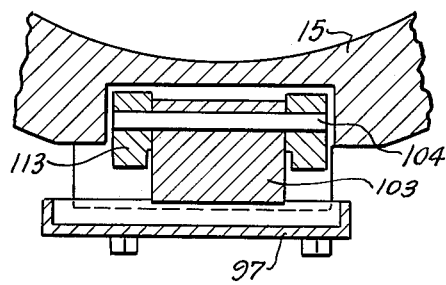
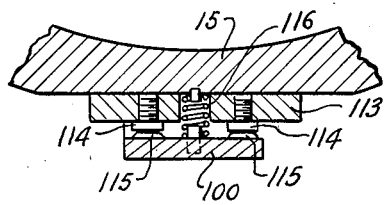
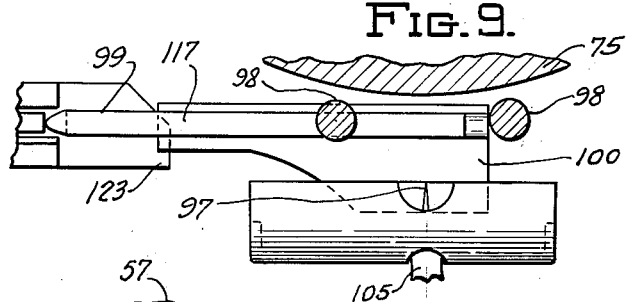
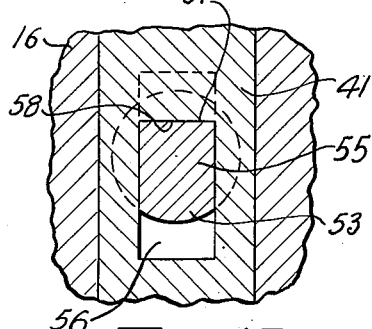
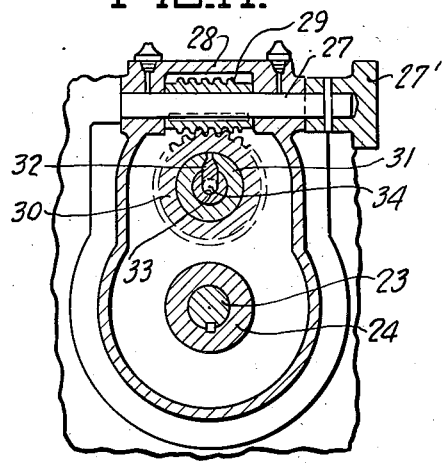
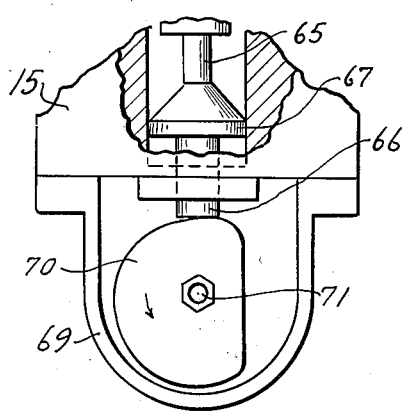
INVENTOR.
Alan H. Pearson
BY
ATTORNEYS Patented Feb. 12, 1952

2,585,828

UNITED STATES PATENT OFFICE 2,585,828

ROTARY INDEXING FIXTURE

Alan H. Pearson, Detroit, Mich., assignor to Pearson, Inc., Detroit, Mich., a corporation of Michigan Application February 18, 1946, Serial No. 648,463

15 Claims. (Cl. 90—56)

The invention relates generally to indexing fixtures and refers more particularly to improvements in indexing fixtures having a rotary work supporting table.

One of the objects of this invention is to provide an indexing fixture having means for locating the table in any one of a number of angular positions of adjustment in accordance with the law of sines. The sine-bar method of measuring or determining angles has long been recognized as extremely accurate and the design as well as the construction of the fixture is such as to take full advantage of this accuracy.

Another object of this invention is to provide means for firmly clamping the table in any one of its angular positions of adjustment by exerting the clamping force in such a manner that it does not interfere with the accuracy of the table setting regardless of the magnitude of this force. In accordance with this invention, the clamping force is substantially uniformly applied throughout the circumference of a cylindrical hub on the table in a generally radial direction, so that the clamping pressure does not tend to tilt the table or otherwise interfere with the table setting.

A further feature of this invention is to provide an indexing fixture wherein the work supporting table may be readily disconnected from the driving means therefor, and as a result, may be freely rotated to approximate predetermined locations without the necessity of operating through the usual reduction gearing provided. This arrangement saves considerable time in initially setting the table where the latter must be rotated throughout a substantial distance to approach the desired setting.

Still another object of this invention is to provide an indexing fixture having means for locating the table to predetermined angular positions without the necessity of making mathematical computations and without the necessity of attempting to manipulate the vernier dials usually associated with the hand wheels. In general, the table is accurately located by supporting a gage bar beneath the rotatable member of the table for selective abutting engagement with gage pins predeterminedly positioned on the rotatable member of the table adjacent to the periphery of the latter. The gage bar is supported in a suitable holder and is set in accordance with the law of sines, so that the table is accurately positioned.

A still further object of this invention is to provide an indexing fixture of the above general type with means responsive to disconnecting the table from the driving means to move the gage bar laterally out of the path of travel of the gage pins so that the table may be freely rotated without interference from the gage bar.

The foregoing as well as other objects will be made more apparent as this description proceeds, especially when considered in connection with the accompanying drawings, wherein.

Figure 1:
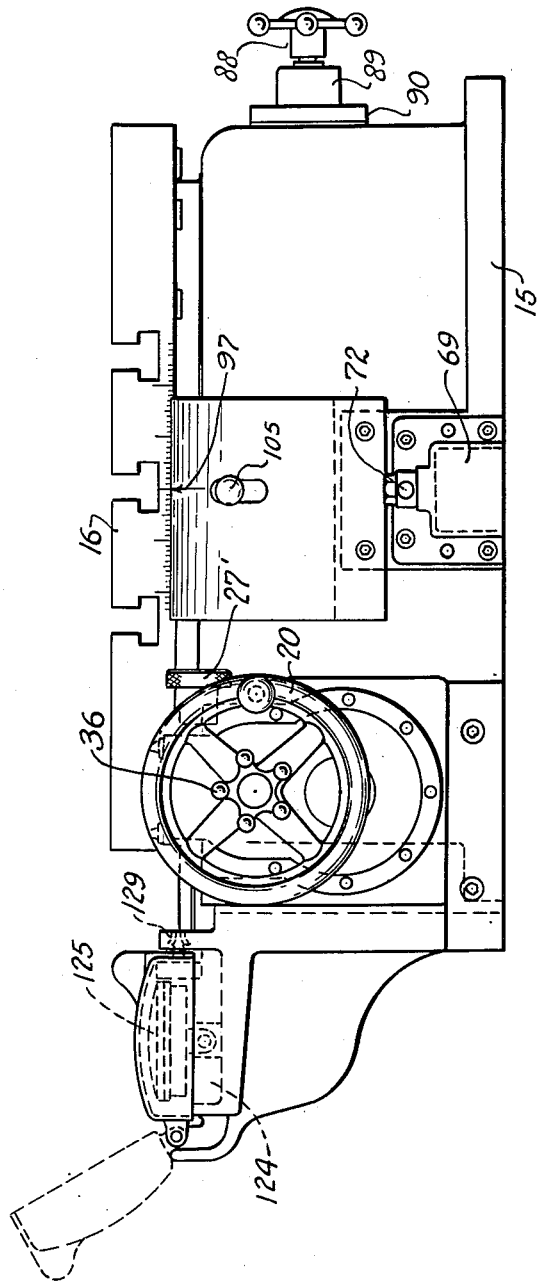
Figure 1 is a front elevational view of an indexing fixture embodying the features of this invention.
Figure 2:
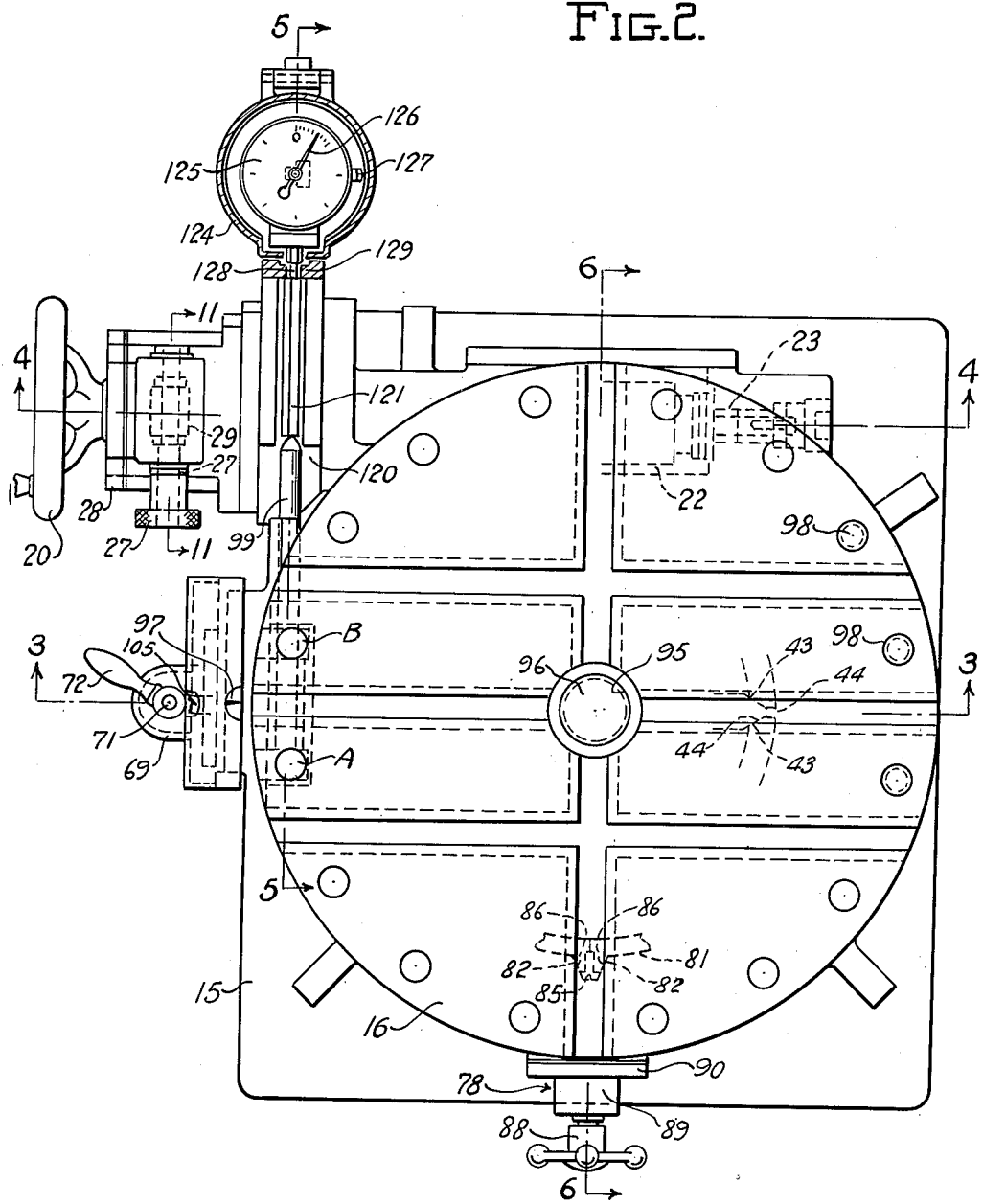
Figure 2 is a plan view, partly in section, of the fixture shown in Figure 1.
Figure 3:
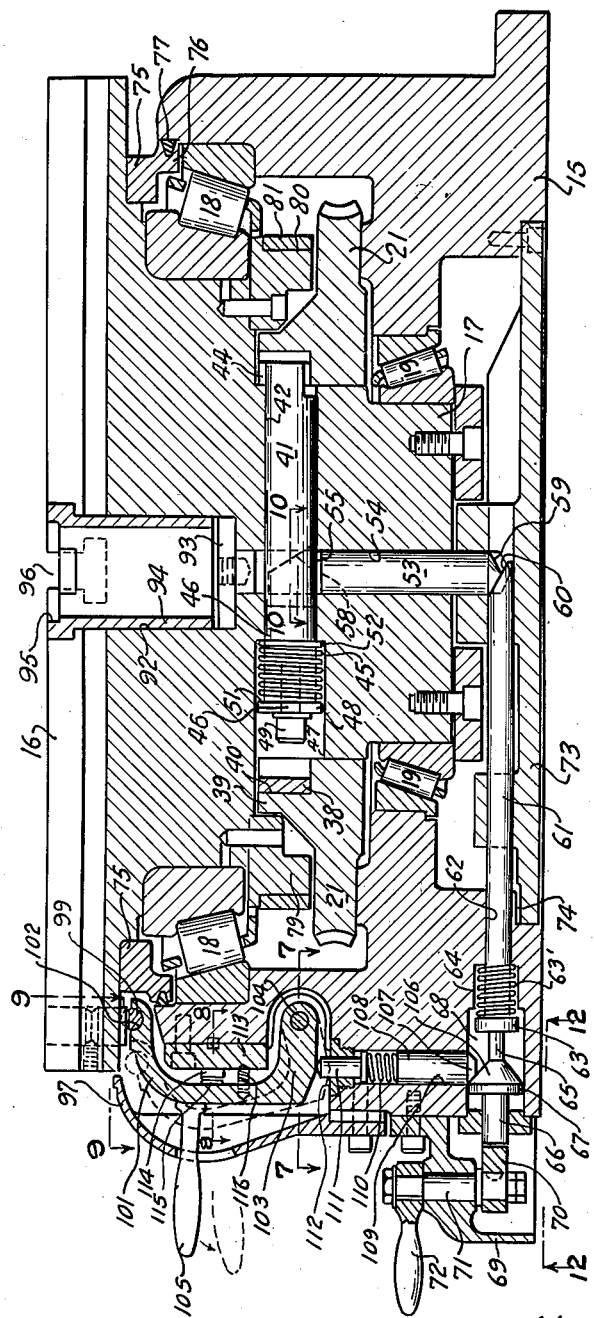
Figure 3 is a sectional view taken substantially on the plane indicated by the line 3—3 of Figure 2.

Figures 7, 8, 9 and 10 are respectively sectional views taken on the lines 7—7, 8—8, 9—9 and 10—10 of Figure 3;

Figure 11 is a sectional view taken on the plane indicated by the line 11—11 of Figure 2; and Figure 12 is a sectional view taken on the line 12—12 of Figure 3.

The indexing fixture selected for the purpose of illustrating this invention comprises a base 15 and a work supporting table 16 supported on the base for rotation about a vertical axis. The base 15 has a central opening therethrough for receiving a hub 17 projecting downwardly from the table in concentric relation to the axis of the table and journalled in a pair of roller bearings 18 and 19 spaced from each other axially of the hub 17. The top bearing 18 is of sufficient diameter to support the table adjacent its periphery and the bottom bearing 19 may be somewhat smaller in diameter. However, both bearings are made to very close tolerances and are of the size required to assure true running of the table regardless of the load distribution on the table.

Figure 4:
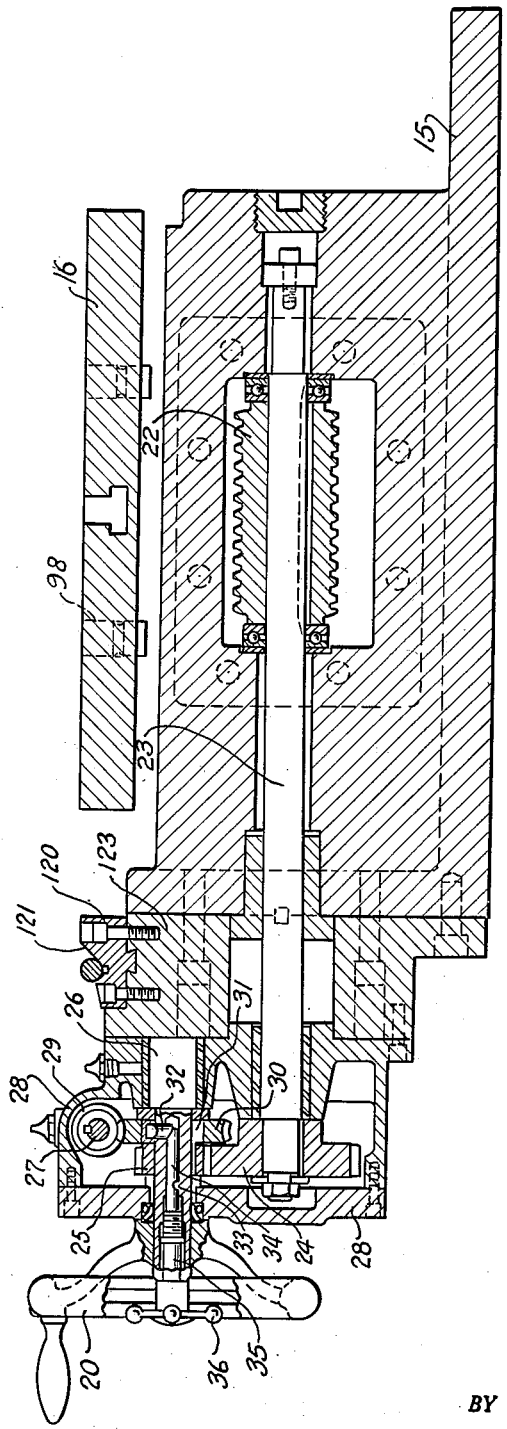
Figure 4 is a sectional view taken substantially on the plane indicated by the line 4—4 of Figure 2.
Figure 5:
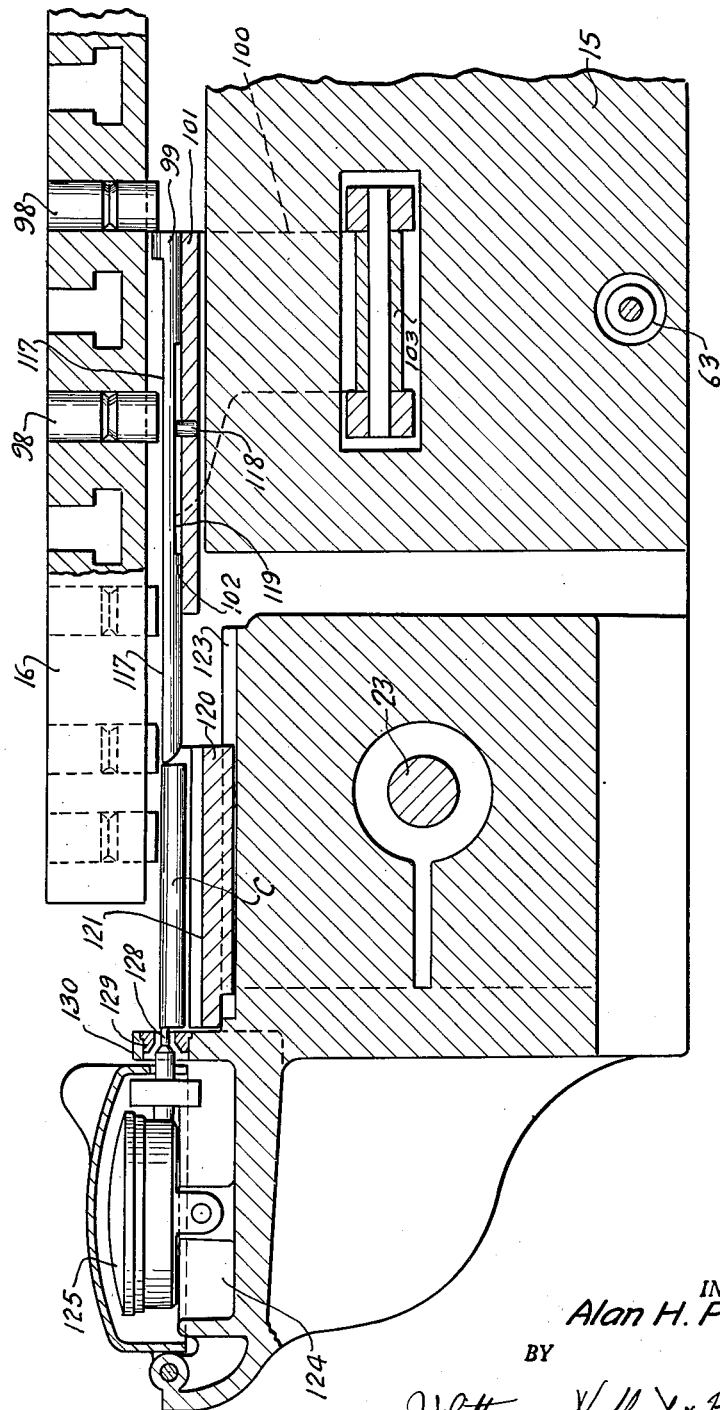
Figure 5 is a sectional view taken substantially on the plane indicated by the line 5—5 of Figure 2.
Figure 6:
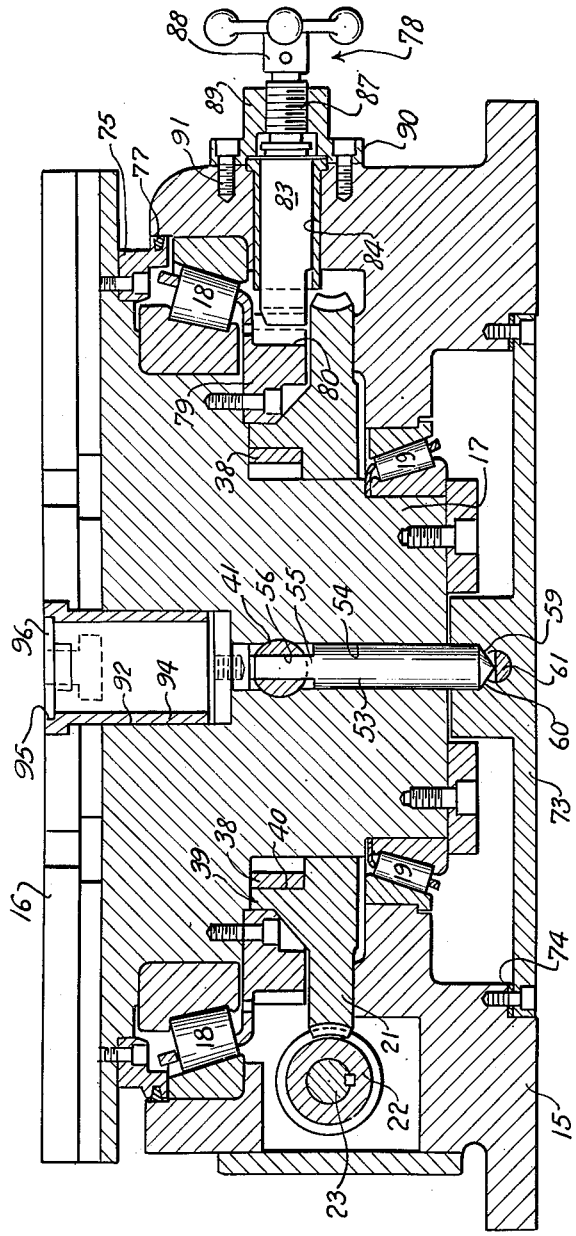
Figure 6 is a sectional view taken on the plane indicated by the line 6—6 of Figure 2.

The table 16 is rotated by a hand wheel 20 through suitable reduction gearing comprising a worm wheel 21 and a worm 22. The worm wheel 21 is freely rotatably mounted on the hub 17 in meshing relation with the worm and the latter is secured to a shaft 23 journalled on the base 15 in the manner shown in Figure 4 of the drawings. A spur gear 24 is secured to the outer end of the shaft 23 in meshing relation with a relatively small pinion 25 secured to the hand wheel shaft 26. This gearing affords a further reduction between the hand wheel 20 and the table 16. The total reduction is determined to effect a rotation of the table throughout one degree of travel for each complete revolution of the hand wheel. A still finer adjustment of the table may be obtained by the mechanism shown in Figure 11 of the drawings. This mechanism comprises a hand knob 27' secured to one end of a shaft 27 suitably journalled in a housing 28 and having a worm gear 29 secured thereto. The worm 29 meshes with a worm wheel 30 freely rotatably supported on the shaft 26 and selectively connected to the shaft 26 by a spreader 31. As shown in Figure 11 of the drawings, the spreader 31 is in the form of a split ring mounted on the shaft 26 within a central opening formed in the worm wheel 30 and having cam surfaces at the ends thereof engageable with corresponding cam surfaces formed on the outer end of a cam or pin 32. The pin 32 is slidably supported in a bore formed in the shaft 26 with its axis extending radially of the axis of the shaft 26 and the inner end of the pin projects into bore 33 extending axially of the shaft 26. A plunger 34 is slidably supported in the bore 33 and the inner end of the plunger is formed with a forty-five degree chamfer engaging a correspondingly inclined surface on the radially inner end of the pin 32. The shaft 26 is provided with a threaded counterbore at the outer end for threadably receiving the inner end of a shaft 35 having a hand knob 36 fixed to the outer end thereof.

The knob 36 is positioned at the outer side of the hand wheel 20 for convenient manipulation. The construction is such that when it is desired to provide a micrometer adjustment of the table 16, the operator merely rotates the hand knob 36 in a clockwise direction to thread the shaft 35 into the counterbore sufficiently to engage the inner end of the shaft 35 with the adjacent outer end of the plunger 34. As a result, the plunger is moved inwardly and the pin 32 is moved radially outwardly to spread the ring 31 into frictional contact with the inner surface of the worm wheel 30. Thus, the worm wheel 30 is connected to the shaft 26 and rotation of the shaft 27 by the hand knob 27' rotates the shaft 26 at a reduced speed. Inasmuch as the shaft 26 is connected to the shaft 23 by the reduction gearing 24 and 25, and since the worm 22 on the shaft 23 meshes with the worm wheel 21, it follows that the latter is rotated at an extremely slow rate by the hand knob 27'.

It has been stated that the worm wheel 21 is freely rotatably supported on the hub 17 of the table 16. Thus, in order for the worm wheel 21 to effect rotation of the table 16, it must first be connected to the table. As shown in Figure 3 of the drawings, this is accomplished by expanding a split band 38 in frictional engagement with the worm wheel 21. In detail, the worm wheel 21 is formed with an upwardly extending annular flange 39 having an inner cylindrical surface 40 concentric with the axis fo rotation of the table 16 and the band 38 is supported within the flange for engagement with the cylindrical surface 40.

The band is connected to the hub 17 of the table 16 by a plunger 41 slidably supported in a bore 42 formed in the hub 17 with its axis extending radially with respect to the axis of rotation of the table. One end of the plunger 41 is formed with converging cam surfaces 43, respectively engageable with correspondingly inclined surfaces 44 on adjacent ends of the band and normally urged in a direction away from the ends of the band by a coil spring 45 surrounding the opposite end 46 of the plunger 41. The end 46 of the plunger 41 is located in a counterbore 47 and a stop washer 48 having a diameter greater than the diameter of the plunger is secured to the end 46 by a fastener element 49. Thus, the stop washer 48 cooperates with the base of the counterbore 47 to form axially spaced shoulders 51 and 52. The coil spring 45 surrounds the plunger between the shoulders and normally holds the plunger 41 in a position wherein the band 38 is collapsed or, in other words, is out of frictional contact with the surface 40 on the gear 39.

The plunger 41 is moved against the action of the spring 45 in a direction toward the band 38 to expand the latter into frictional contact with the cylindrical surface 40 on the ring gear 21 by a push rod 53. The push rod 53 is supported for sliding movement in a bore 54 formed in the hub 17 of the table in concentric relation to the axis of rotation of the table. The upper end of the bore 54 intersects the bore 42 and the corresponding end of the push rod 53 is fashioned to provide a flat portion 55. As shown particularly in Figure 10 of the drawings, the flat portion 55 projects into a slot 56 formed in the plunger 41 and is fashioned with an inclined cam face 57 for engagement with a correspondingly inclined cam face 58 on the adjacent wall of the slot 56. The lower end of the push rod 53 is formed with a conical portion 59 adapted to be engaged by an inclined cam face 60 formed on the inner end of a second push rod 61. The outer end portion of the push rod 61 extends through a bore 62 formed in the base 15 and is provided with an enlargement 63. A coil spring 63' surrounds the rod 61 at the inner side of the enlargement 63 and the inner end of the coil spring is seated on an annular shoulder 64 formed by counterboring the outer end of the bore 62. The arrangement is such that the spring 63' normally urges the rod 61 in a direction away from the rod 53 so that the rod 53 is normally in its inoperative position with respect to the plunger 41. The extreme outer end 65 of the rod 61 engages a plunger 66 having a head 67 on the inner end slidably engageable in a counterbore 68 and having the outer end projecting into a housing 69 for engagement with a cam 70. The cam 70 is secured to a rotatable shaft 71 journalled in the housing 69 and having a control handle 72 secured thereto.

The plunger 66 is normally urged into contact with the cam 70 by the spring 63', so that rotation of the cam by the handle 72 shifts the push rod 61 inwardly and moves the rod 53 upwardly by reason of the engagement between the conical lower end 59 of the rod and the cam face 60 on the inner end of the rod 61. Owing to the fact that the cam surface 57 on the upper end of the rod 53 engages the corresponding cam surface 58 on the plunger 41, it follows that upward movement of the rod 53 effects a radial movement of the plunger 41 against the action of the spring 45 to engage the cam surfaces 43 on the plunger with the corresponding cam surfaces 44 on the adjacent ends of the band 38. Continued radial movement of the plunger 41 in the above direction expands the band into frictional engagement with the cylindrical surface 40 in the worm wheel 21, and the latter is thereby connected to the hub 17 of the table. As a result, the table may be rotated by manipulating either the hand wheel 20 or the knob 27', depending upon whether approximate or accurate adjustment of the table is required.

Referring again to Figure 3 of the drawings, it will be noted that the push rod 61 is slidably supported in a cover plate 73 suitably secured to the base 15 to form a closure for the central opening formed in the base. A sealing gasket 74 is preferably provided between the plate 73 and the base 15 to prevent foreign matter from escaping into the apparatus and fouling the bearing 19. Foreign matter is also prevented from escaping into the upper end of the central opening through the base and fouling the top bearing 18 by a sealing ring 75 suitably secured to the underside of the table for rotation as a unit with the latter and having an annular portion 76 extending into the upper end of the central opening formed in the base 15. An annular groove is formed in the portion 76 and a ring 77 of sealing material is secured in the groove with the periphery frictionally engaging the inner wall of the central opening through the base 15.

The table may be clamped in any one of a number of angular positions of adjustment by a clamping device indicated generally by the reference character 78. The clamping device comprises a ring 79 secured to the table 16 and having a cylindrical surface 80 concentrically arranged with respect to the axis of rotation of the table. In the present instance, the ring is positioned between the bearings and surrounds the annular flange 39 on the worm wheel 21. This construction assures a compact and highly effective arrangement. In any event, a split band 81 is positioned to surround the cylindrical surface 80 and the ends of the band are respectively formed with converging cam faces 82.

The band is contracted against the cylindrical surface 80 by means of a plunger 83 slidably supported in a bore 84 formed in the side wall of the base 15 with its axis extending radially with respect to the axis of rotation of the table. The inner end of the plunger is formed with a recess 85 and the opposite ends of the recess are inclined or, in other words, diverge from the base of the recess to form cam faces 86. The band 81 is angularly positioned so that the cam faces 82 on the ends thereof project into the recess 85 and respectively engage the cam faces 86 on the plunger 83. The radially outer end of the plunger 83 is adapted for engagement by the inner end of a shaft 87 having a hand knob 88 secured to the outer end thereof. The shaft 87 is threaded and threadably engages a cap 89 having an attaching flange 90 secured to the adjacent side of the base 15 by fastener elements 91. Thus, by turning the hand knob 88 in one direction, the plunger 83 is forced inwardly to contract the band 81 against the cylindrical surface 80 on the ring 79. Inasmuch as the ring 79 is secured to the table 16, it follows that the latter is held against rotation. It is important to note that the clamping pressure applied to the table by the band is exerted radially and substantially uniformly throughout the circumference of the cylindrical surface 80, so that this pressure does not affect or disturb the position of the table with respect to the base. The table may be readily released by merely rotating the hand knob in the opposite direction sufficiently to release the clamping pressure on the band 81.

Provision is also made for conveniently locating work on the top of the table and this is accomplished by axially boring the table top to form a centrally located bore 92. A plug 93 is positioned at the bottom of the bore to close the latter and a bushing 94 is secured in the bore. The upper end of the bushing is formed with a recess 95 and a plug 96 is supported in the recess to prevent chips and other foreign matter from entering the bushing. This plug may be readily removed when it is desired to use the bushing for indicating purposes.

It has been previously stated that the table 16 is rotated to approximate predetermined angular positions by manipulating the hand wheel 20. To assist this operation, the periphery of the table is graduated in degrees, and a pointer 97 is fixed against rotation with the table immediately adjacent the periphery to indicate the degree graduations of the table.

In order to enable accurately positioning the table in any preselected angular position, the table is provided with a plurality of gage pins 98. The gage pins are respectively mounted in bores formed in the table adjacent the periphery of the latter and are spaced equal distances from each other circumferentially of the table. Although the number of gage pins may be varied depending on the use of the table, nevertheless, for the purpose of illustration, sixteen gage pins are shown. These pins are spaced from each other throughout an angular distance of twenty-two and one-half degrees and the lower ends of the pins project below the bottom of the table for selective engagement with the inner end of a gage rod 99.

The gage rod 99 is slidably supported by a holder 100 with the axis of the rod extending as a chord of the geometric circle intersecting the axes of the gage pins 98. The holder 100 is substantially U-shaped in cross section and the top leg 101 of the holder is formed with a longitudinally extending groove 102 for slidably supporting the gage bar 99 in the above described position. The bottom leg 103 of the holder is hinged to the base 15 by a pin 104 in a manner to enable swinging the top leg 101 from the full line position shown in Figure 3 of the drawings to the broken line position wherein it will be noted that the gage bar is located out of the path of travel of the gage pins 98. Swinging of the holder to the broken line position shown in Figure 3 of the drawing may be effected manually by pulling the handle 105 or may be accomplished automatically in response to releasing the worm wheel 21 from the hub 17 of the table by rotating the cam 70 to its inoperative position. In detail, the head 67 on the plunger 66 is formed with a frustro-conical surface 106 at the inner end engageable with a corresponding surface 107 on the lower end of a plunger 108. The plunger 108 is slidably supported in a bore 109 formed in the base 15 with its axis extending vertically and the upper end of the plunger 108 is engaged by the lower end of a coil spring 110 having the upper end abutting the lower end of a second plunger 111. The plunger 111 is slidably supported in a stop nut 112 threaded in the upper end of the bore 109 and the upper end of the plunger engages the bottom leg 103 of the holder at a point spaced outwardly from the axis of the pin 104.

Thus, when the plunger 66 is held in its innermost position by the cam 70, or in other words, when the worm wheel 21 is connected to the table 16 by the band 38, the holder 100 is held in its innermost position wherein the inner end of the gage rod 99 is located in the path of travel of the gage pins 98. The holder is accurately located in its operative or innermost position by a bracket 113 secured to the base 15 and having pins 114 projecting outwardly therefrom into engagement with the bosses 115 on the inner surface of the base portion of the U-shaped holder. The base portion of the holder is normally urged to its broken line or inoperative position by a coil spring 116 having the inner end abutting the base 15 and having the outer end engaging the base portion of the holder. The spring 116 is not sufficiently strong to overcome the force applied by the spring 110 when the latter is compressed between the adjacent ends of the plungers 108 and 111, so that the holder is held by the spring 110 in its operative or full line position shown in Figure 3 of the drawing, regardless of the opposing force applied by the spring 116. However, when the cam 70 is rotated from the operative position thereof shown in Figure 3 of the drawings to release the band 38 from the worm wheel 21, the plunger 66 is moved outwardly by the spring 63' and the plunger 108 is moved downwardly sufficiently to release the tension on the spring 110. As a result, the force exerted on the holder by the spring 116 predominates the force applied by the spring 110 and the holder is swung outwardly to position the inner end of the gage rod 99 out of the path of travel of the gage pins 98. The table 16 may then be quickly rotated without going through the reduction gearing by applying a rotative force directly to the table. The holder remains in its inoperative position until the cam 70 is again rotated to move the plunger 66 inwardly and expand the band 38 against the cylindrical surface 40 on the worm wheel to again connect the latter to the table. As the plunger 66 moves inwardly, the frustro-conical surface 106 abuts the corresponding surface 107 on the lower end of the plunger 108 and moves the latter upwardly. As a result, the spring 110 is compressed and the plunger 111 is moved upwardly to swing the holder 100 to its operative position wherein the inner end of the gage rod 99 again assumes a position in the path of travel of the gage pins 98.

As shown in Figure 2 of the drawing, when the gage rod 99 is in its operative position with the inner end engaging the gage pin A, the next preceding gage pin B assumes a position above the gage rod 99. In order to provide sufficient clearance for the gage pin B, the rod 99 is formed with a flat on the top which extends from the outer end of the rod to a point adjacent the inner end. The flat portion 117 of the rod 99 provides ample clearance for the gage pins 98 and is held at the top of the rod 99 by a pin 118 extending upwardly from the base of the groove 102 in the holder. The pin engages in a longitudinally extending groove 119 formed in the bottom of the gage rod, so as to permit sliding of the rod 99 relative to the holder, but to prevent rotation of the rod relative to the holder.

Supported at the outer end of the holder 100 is an elongated block 120 having a longitudinally extending V-shaped groove 121 aligned with the groove 102 or with the gage rod 99. The V-block 120 is secured to the top of an indicator housing 123, suitably secured to the base 15, and having a recess 124 beyond the outer end of the V-block 120 for supporting a dial type indicator 125. The indicator may be of orthodox design having a rotatable pointer 126 and having a dial graduated (.00005) of an inch. A suitable lock screw 127 is provided for setting the indicator to zero reading and the pointer is connected to a spindle 128 supported in alignment with the groove 121 in the block. The spindle 128 projects through a stop bushing 129 anchored in a bore formed in an upstanding projection 130 on the indicator housing 123.

The accuracy of the various settings of the table 16 depends to a large extent on the accuracy of the spacing of the gage pins 98 around the periphery of the table and, in the present instance, a master rod "C" is used to calibrate or locate the gage pins. Thus, the master rod is formed to an exact length which corresponds to the decimal equivalent of the sine of the angle between adjacent gage pins 98. As stated above, the gage pins 98 are spaced from each other throughout an angular distance of twenty-two and one-half degrees, so the length of the master rod is equal to the decimal equivalent of the sine of this angle. The master rod is engaged in the groove 121 in the block 120 with the outer end of the rod in contact with the free end of the spindle 128 on the dial indicator 125 and with the inner end of the rod adjacent the outer end of the gage rod 99. The table 16 is rotated in a clockwise direction to engage the gage pin A, for example, with the inner end of the gage rod 99. Rotation of the table in the above direction is continued by manipulating the micrometer adjustment or knob 27' until the master rod is moved into abutting engagement with the stop bushing 129 by the gage rod 99. When this condition exists, the dial indicator 125 is set to read zero by manipulating the lock screw 127 provided for this purpose. The table 16 is then clamped by the clamp 78 and the holder 100 is swung outwardly by manipulating the handle 105 to locate the gage rod out of the path of travel of the gage pins 98. The clamp 78 is then released and the table 16 is rotated in a counterclockwise direction to locate the next adjacent gage pin B beyond the inner end of the gage rod 99. The holder is then released and is returned by the spring 110 to again position the gage rod 99 in its operative position. When this is accomplished the table 16 is again rotated in a clockwise direction to engage the gage pin B with the outer end of the gage rod 99 and to engage the outer end of the master rod with the stop bushing 129. If at this time, the dial indicator reads zero, it is a known fact that the pins A and B are spaced twenty-two and one-half degrees from each other. On the other hand, if the dial indicator does not read zero, sufficient stock is removed from the pin until a zero reading is obtained. The above procedure is followed for each gage pin 98 and when completed, assures obtaining a construction wherein adjacent gage pins are spaced exactly twenty-two and one-half degrees from each other.

Assuming now that it is desired to bore a hole in a work piece clamped on the table at an angle of twenty-five degrees, twelve minutes and eight seconds, the operator merely manipulates the hand wheel 20 to rotate the table 16 throughout an angular distance somewhat greater than the above noted angle. For this purpose, the graduations on the periphery of the table in conjunction with the pointer 97 may be used. The decimal equivalent of the sine for the angle of twenty-five degrees, twelve minutes and eight seconds is then determined by consulting a table supplied with the fixture and a gage member or members are selected having a length or a combined length equal to the decimal equivalent of the sine of the above angle. The gage members may be in the form of blocks, rods, or if desired, an inside micrometer may be used. Regardless of the particular gaging means employed, the latter is placed in the V-shaped groove 121 in the block 120 and the table 16 is rotated in a clockwise direction to engage the adjacent gage pin 98 with the inner end of the gage rod 99. Continued rotation of the table in the above direction slides the rod 99 outwardly relative to the holder 103 into engagement with the gaging member or members in the V-shaped groove 121 and urges the latter gaging means into engagement with the spindle 128 of the dial indicator 125. The table 16 is then operated by the micrometer adjusting knob 27' to obtain a zero reading on the dial indicator 125 and when this is accomplished, the hole to be bored in the work piece is accurately located at the specified angle. The clamp 78 is then operated to firmly hold the table 16 in its adjusted position.

It follows from the foregoing that the sine bar principle of measurement is applied to a rotary indexing table for locating the latter in any one of a number of angular positions of adjustment. Thus, the necessity of making complicated mathematical computations preparatory to setting the table and the attendant chance of error is eliminated. Also, the usual "minute" and "second" degree graduations may also be eliminated, since the degree graduations on the periphery of the table are relied upon solely for approximate adjustments of the table and any error in such graduations does not affect the accuracy of the table setting as is the case in orthodox indexing fixtures.

What I claim as my invention is:

1. An indexing fixture comprising a rotatable table having circumferentially spaced projections, a gage member, a holder for the gage member supported for movement relative to the table in directions to position the gage member into and out of the path of said projections, means normally urging the holder to a position wherein the gage member is located in the path of travel of the projections, driving means connected to the table for rotating the latter, means for disconnecting the driving means from the table permitting free rotation of the table relative to said driving means, and means responsive to disconnecting the driving means to move the holder to a position wherein the gage member is located out of the path of travel of the projections.

2. An indexing fixture comprising a rotatable table having gage pins projecting from the bottom surface in accurate spaced relationship circumferentially of the table, means for accurately locating the table in any one of a number of angular positions of adjustment including a gage bar having one end selectively engageable with the pins, a holder for said bar supported for movement in directions to position the bar into and out of the path of travel of the pins, means normally urging the holder to a position wherein the gage bar is located in the path of travel of the pins, driving means connected to the table for rotating the latter, means for disconnecting the table from the driving means, and means for moving the holder to locate the gage bar out of the path of travel of the pins in response to disconnecting the driving means from the table.

3. An indexing fixture comprising a rotatable table having circumferentially spaced projections, a gage member, a holder for the gage member supported for swinging movement relative to the table to position the gage member into and out of the path of travel of the projections, means normally urging the holder to a position wherein the gage member is located in the path of the projections, driving means for rotating the table, releasable means for connecting the table to the driving means, and means for releasing the driving means from the table and for swinging the holder to a position wherein the gage member is located out of the path of travel of said projections.

4. An indexing fixture comprising a rotatable table having gage pins projecting from the bottom surface in accurate spaced relationship circumferentially of the table, means for accurately locating the table in any one of a number of angular positions of adjustment including a gage bar having one end selectively engageable with the pins, a holder for said bar supported for movement in directions to position the bar into and out of the path of travel of the pins, means normally urging the holder to a position wherein the gage bar is located in the path of travel of the pins, driving means for rotating the table, releasable means for connecting the table to the driving means including a plunger slidably on the table, means for operating the plunger to release said driving means, and means responsive to movement of the plunger in a direction to release the table from the driving means to move the holder in a direction to position the gage bar out of the path of travel of the gage pins.

5. An indexing fixture comprising a rotatable table having circumferentially spaced projections, a gage member supported in the path of travel of the projections, a holder for the gage member supported for movement relative to the table to locate the gage member out of the path of travel of the projections, driving means for the table releasable from the latter, and means responsive to releasing the driving means from the table to move said holder with the gage member out of the path of travel of said projections.

6. An indexing fixture comprising a rotatable table having circumferentially spaced projections concentrically arranged with respect to the axis of the table, a gaging element slidably supported along a path extending generally tangent to a circle intersecting the projections and having one end selectively engageable by said projections, a holder for slidably supporting the gaging element in a position to engage an adjacent projection and movable laterally relative to the table to position the gaging element out of the path of travel of the projections.

7. The indexing fixture set forth in claim 6 in which means is provided for predeterminedly positioning the gaging element relative to the holder and thereby accurately locate the table in a preselected angular position.

8. The indexing fixture set forth in claim 6 in which the holder is pivotally supported for swinging the gaging element into and out of operative relation with said projections on the table.

9. The indexing fixture set forth in claim 6 having releasable driving means for rotating the table and having means for moving the holder to a position out of the path of travel of the projections in response to releasing said driving means.

10. An indexing fixture comprising a rotatable table having circumferentially spaced projections, a gaging element positioned to selectively engage the projections, a holder supporting the gaging element for sliding movement toward and away from an adjacent projection, means for locating the gaging element on the holder in different predetermined positions relative to an adjacent projection on the table to accurately locate the table in preselected angular positions, and means supporting the holder for movement relative to the table in a direction to position said gaging element out of the path of travel of said projections.

11. The indexing fixture set forth in claim 10 in which the holder is pivotally supported to one side of the table for swinging movement from a position wherein the gaging element is located in the path of travel of the projections to a position wherein said gaging element is spaced from the path of travel of the projections.

12. The indexing fixture set forth in claim 10 having driving means releasably connected to the table and having means responsive to releasing the driving means for moving the holder to a position wherein the gaging means is spaced from the path of travel of said projections.

13. An indexing fixture comprising a rotatable table having circumferentially spaced projections, releasable driving means for rotating the table, control means for selectively connecting the driving means to and releasing the driving means from the table, a gaging element positioned to selectively engage the projections, a holder supporting the gaging element for sliding movement toward and away from an adjacent projection, means for predeterminedly positioning the gaging element on the holder to accurately locate the table in a preselected angular position, means supporting the holder for movement relative to the table in directions to respectively locate the gaging element in operative and inoperative positions with respect to the projections, means for selectively operating the holder to move said gaging means to either of said positions, and means operated by the control means for moving said holder independently of said holder operating means.

14. The indexing fixture set forth in claim 13 in which the holder is moved by the control means to locate the gaging means in an inoperative position with respect to the projections upon movement of the control means to release the driving means from the table.

15. An indexing fixture comprising a rotatable table having circumferentially spaced projections, releasable driving means for rotating the table, control means for selectively connecting the driving means to and releasing the driving means from the table, a gaging element positioned to selectively engage the projections, a holder supporting the gaging element for sliding movement toward and away from an adjacent projection, means for predeterminedly positioning the gaging element on the holder to accurately locate the table in a preselected angular position, means supporting the holder for movement relative to the table in directions to respectively locate the gaging element in operative and inoperative positions with respect to the projections, and an operative connection between the control means and holder for moving the holder upon operation of said control means.

ALAN H. PEARSON.

REFERENCES CITED

The following references are of record in the file of this patent:

UNITED STATES PATENTS

| Number | Name | Date |
| --- | --- | --- |
| 292,140 | Scheffler | Jan. 15, 1884 |
| 568,006 | Sweet | Sept. 22, 1896 |
| 1,100,522 | Brown et al. | June 16, 1914 |
| 1,649,411 | Kaseberg | Nov. 15, 1927 |
| 1,730,063 | Dustan | Oct. 1, 1929 |
| 1,875,739 | Kearney | Sept. 9, 1932 |
| 1,923,440 | Hunt et al. | Aug. 22, 1933 |
| 2,329,756 | Granberg et al. | Sept. 21, 1943 |
| 2,342,539 | Gorton | Feb. 22, 1944 |
| 2,364,478 | Schreiber | Dec. 5, 1944 |
| 2,376,137 | Hallowell | May 15, 1945 |

FOREIGN PATENTS

| Number | Country | Date |
| --- | --- | --- |
| 539,746 | Great Britain | Sept. 23, 1941 |